UNITED STATES PATENT OFFICE.

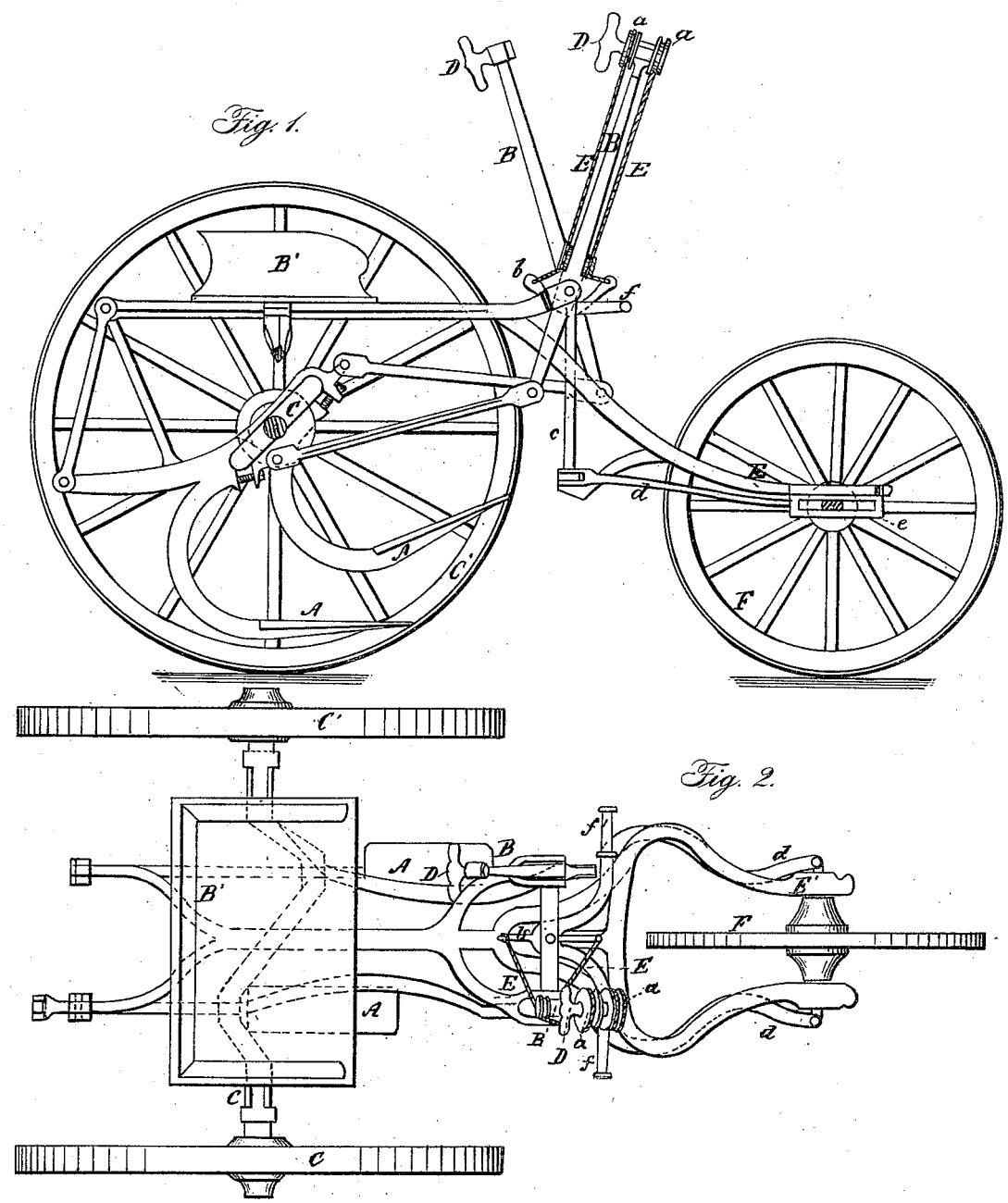

JOSEPH GOODMAN, OF BLACKFRIARS ROAD, COUNTY OF SURREY, ENGLAND, ASSIGNOR TO CHARLES P. BUTTON, OF NEW YORK, N. Y.

IMPROVEMENT IN VELOCIPEDES.

Specification forming part of Letters Patent No. 44,256, dated September 13, 1864.

*To all whom it may concern:*

Be it known that I, JOSEPH GOODMAN, of Blackfriars Road, in the county of Surrey, England, have invented a new and Improved Velocipede, which I term "Rantoone;" and I do hereby declare that the following is a full, clear, and exact description thereof, which will enable those skilled in the art to make and use the same, reference being had to the accompanying drawings, forming a part of this specification, in which—

Figure 1 represents a longitudinal vertical section of my invention. Fig. 2 is a plan or top view of the same.

Similar letters of reference indicate corresponding parts.

This invention consists in connecting treadles and hand-levers to the cranked axle, to which the main wheels of the carriage are fixed, in such a manner that the velocipede can be propelled either by hand or by the feet, or by the combined action of both hands and feet; also, in arranging handles to the hand-levers, one or both of which connect through chains or cords with the fore-carriage in which the guide wheel is fitted, and turn it in any direction required for guiding the carriage; finally, in mounting the axle of the guide wheel in a groove made in or applied to the sides of the fore-carriage.

A A are treadles and B B hand-levers, all connected to the cranked axle C of the main wheels C', so that by stepping on the treadles, and alternately depressing the same, a person sitting on the seat B' is enabled to impart to the crank-axle and to the wheels a rotary motion, or that by pulling the hand-levers alternately, at proper intervals, the same effect is produced, or, finally, the combined action of the hands and feet can be brought to bear on the crank-axle, if it is desirable. The hand-levers are provided with handles D D, which serve to operate said levers, and one or both these handles are provided with pulleys $a$ $a$, to connect through a chain or cord, E E, with the fore carriage E, in which the guide-wheel F is fitted. The two ends of the chain E connect to the opposite ends of a tiller, $b$, which is fastened in its center to a vertical arbor, $c$, and this arbor connects by means of curved arms, $d$, with the ends of the axle of the guide-wheel. Said axle has its bearings in slots $e$ in the fore-carriage, and by turning the tiller $b$ in either direction the guide-wheel is turned toward one or toward the other side, as may be desired. The arbor $c$ is also furnished with foot-levers $f$, extending from the same in opposite directions, as clearly shown in Fig. 2, so that by placing the feet on this foot-lever the operation can be effected without the aid of the hands; but if the feet are used for the purpose of propelling the velocipede, the operation of steering is effected by turning the handles D D, or either of them, in the requisite direction. The wheels C' are firmly keyed or otherwise secured to the ends of the crank-shaft C, so that by imparting to said crank-shaft a rotary motion the wheels are compelled to rotate and to propel the velocipede, and the diameter of said wheels is made sufficiently large to impart to the machine the requisite velocity. The steering-wheel F is much smaller than the wheels C', and it is loose on its axle, so that it revolves independent of the same.

The frame is made as light as possible, and when properly constructed and operated it can be propelled with considerable speed.

What I claim as new, and desire to secure by Letters Patent, is—

The combination of the steering devices, consisting of handle D, operating through cords E E with the tiller $b$, which, by rotation of the arbor $c$, turns the arms $d$ and causes the guide-wheel to swerve to the right or left, as may be desired, by the motion of the axle in the slotted bearings of the fore-carriage, the whole of the devices mentioned being combined in the manner and used for the purpose described.

JOSEPH GOODMAN.

Witnesses:
J. BURTON JONES,
GEORGE NEISH-STANLEY.